United States Patent
Rubio Lamas et al.

(10) Patent No.: US 10,231,462 B2
(45) Date of Patent: Mar. 19, 2019

(54) COMESTIBLE PRODUCT SHEETER AND SHEETER ROLLER, AND METHOD OF USING THE SAME

(71) Applicant: GRUMA S.A.B. de C.V., San Pedro Garza Garcia (NL)

(72) Inventors: Felipe A. Rubio Lamas, Edinburg, TX (US); Arturo Garcia Solis, Guadalupe (MX); Rodrigo Lobeira Massu, Guadalupe (MX)

(73) Assignee: Gruma S.A.B. de C.V., San Pedro Garza Garcia (MX)

( * ) Notice: Subject to any disclaimer, the term of this patent is extended or adjusted under 35 U.S.C. 154(b) by 119 days.

(21) Appl. No.: 15/351,944

(22) Filed: Nov. 15, 2016

(65) Prior Publication Data

US 2018/0132489 A1 May 17, 2018

(51) Int. Cl.
  *A21C 3/02* (2006.01)
  *A21C 11/10* (2006.01)
  *A21C 11/00* (2006.01)

(52) U.S. Cl.
  CPC ............ *A21C 3/024* (2013.01); *A21C 11/008* (2013.01); *A21C 11/10* (2013.01); *A21C 3/02* (2013.01)

(58) Field of Classification Search
  CPC ......... A21C 3/02; A21C 3/028; A21C 11/008; A21C 11/10
  See application file for complete search history.

(56) References Cited

U.S. PATENT DOCUMENTS

| | | | |
|---|---|---|---|
| 4,405,298 A | 9/1983 | Blain | |
| 5,180,593 A | 1/1993 | Mistretta et al. | |
| 5,576,033 A | 11/1996 | Herrera | |
| 5,626,898 A | 5/1997 | Caridis et al. | |
| 6,024,554 A | 2/2000 | Lawrence | |
| 6,159,518 A | 12/2000 | Wilson | |
| 7,887,314 B2* | 2/2011 | Ruhe | A21C 3/02 425/194 |
| 8,434,404 B1 | 5/2013 | Herrera | |
| 8,740,602 B2 | 6/2014 | Ruhe et al. | |
| 2006/0034988 A1 | 2/2006 | Bresnahan et al. | |
| 2006/0222749 A1 | 10/2006 | Ruhe et al. | |

FOREIGN PATENT DOCUMENTS

| | | |
|---|---|---|
| EP | 0 340 383 | 11/1989 |
| FR | 2 241 402 A1 | 3/1975 |
| WO | 2018/065573 A1 | 4/2018 |

OTHER PUBLICATIONS

International Search Report and Written Opinion, dated Mar. 1, 2018, from corresponding PCT application No. PCT/US2017/061784.

* cited by examiner

*Primary Examiner* — James P Mackey
(74) *Attorney, Agent, or Firm* — Haynes and Boone, LLP

(57) ABSTRACT

To address the problems inherent in creating very thin sheets of dough in a sheeting machine at high speed and with efficient recycling and re-sheeting of the re-work cut out from the sheet, a new sheeting machine with a new front roller is provided, wherein the roller includes non-stick and non-release areas and a plurality of grooves in the non-release area.

15 Claims, 11 Drawing Sheets

COMESTIBLE PRODUCT SHEETER AND SHEETER ROLLER, AND METHOD OF USING THE SAME

FIELD OF THE INVENTION

The invention is directed toward a sheeter for comestible products and a roller used therein. In a preferred embodiment, the sheeter is used for sheeting flatbreads, in particular tortillas, and includes a front roller with non-stick and non-release areas capable of sheeting thin tortillas at high speed.

DESCRIPTION OF THE RELATED PRIOR ART

Dough sheeting machines are used to produce relatively thin sheets of dough to make various flatbreads, for example tortillas and chips. The dough for these types of products is typically made of a milled grain and water. For example, dough can be made from milled corn, i.e. corn flour, water and other ingredients. The dough is rolled into a thin sheet by pressing and rolling the dough between rollers. A cutting or die roller is pressed against a front roller to cut out the selected shape for the product. For example, tortillas may be cut in a round shape, whereas chips may be cut in triangular shapes. After cutting, the food product is generally fully or partially dried or cooked, for example by baking or frying, and then packaged. While sheeters or dough sheeting machines are most often used with corn flour or wheat flour, they may also be used with doughs made from rice, potato, potato starch, sorghum, millet, or other grain or grain fractions.

While the physical properties of doughs vary depending on the type of ingredient and the particular recipe and handling of the dough, most doughs are adhesive in a manner that causes the dough to stick to the rollers of sheeting machines. This can adversely affect the speed at which the machine can sheet. This can also prevent the sheeting of very thin sheets.

After the food product is cut into the desired shape by the die roller, the cut shapes must be separated from the front roller and conveyed from the sheeting machine to the next production station for further processing. The web remaining on the front roller after cutting can make up a significant fraction of the dough fed into the machine. Consequently, for economical operation, the web, termed rework, must be returned for refeeding into the sheeter machine.

The design of the front roller has competing goals. It must not release the rework so that it can be carried back up and around the front roller and be recycled with the fresh dough coming from the dough hopper and being fed between the two main sheeting roller. However, the front roller must also release the cut out portions of the sheeted dough so that such portions may continue on to the next station. The desire to sheet at high speed and create very thin product further complicates this dilemma.

Various techniques have been proposed for separating the cut food product shapes from the front roller, and for returning the rework to the supply of dough being fed into the sheeter machine. These techniques include use of stripper wires, concave rollers, doctor blades and varying roller speeds.

Stripper wires, i.e., wires tensioned across the front roller, are widely used. Bands have also been used in sheeter machines to hold the striper wire against the roller and to help return the web back into the sheeter machine. Yet significant difficulties remain in the design and operation of sheeter machines, particularly in the effort to create very thin sheets as high speed.

U.S. Pat. Nos. 6,024,554, 8,434,404, 4,405,298, and 5,180,539 have proposed various solutions to some of these problems. For example, the '298 patent discloses the use of a flat band for a stripper wire. The '554 patent discloses the combination of a stripper wire and a nonstick surface in the shape of a pattern that matches the shape of the product cut out from the sheet. The '404 patent discloses the use of stripper wire the partially spirals around a roller. The '539 patent discloses the placement of the stripper wire on the back of the front roller and above a collection arm.

SUMMARY OF THE INVENTION

To address the problems inherent in creating very thin sheets of dough in a sheeting machine at high speed and with efficient recycling and re-sheeting of the re-work cut out from the sheet, a new sheeting machine with a new front roller is provided, wherein the roller includes non-stick and non-release areas and a plurality of grooves in the non-release area.

DESCRIPTION OF THE DRAWINGS

The apparatus and method will be described in connection with the attached drawings in which.

DESCRIPTION OF THE INVENTION

Figure 1:
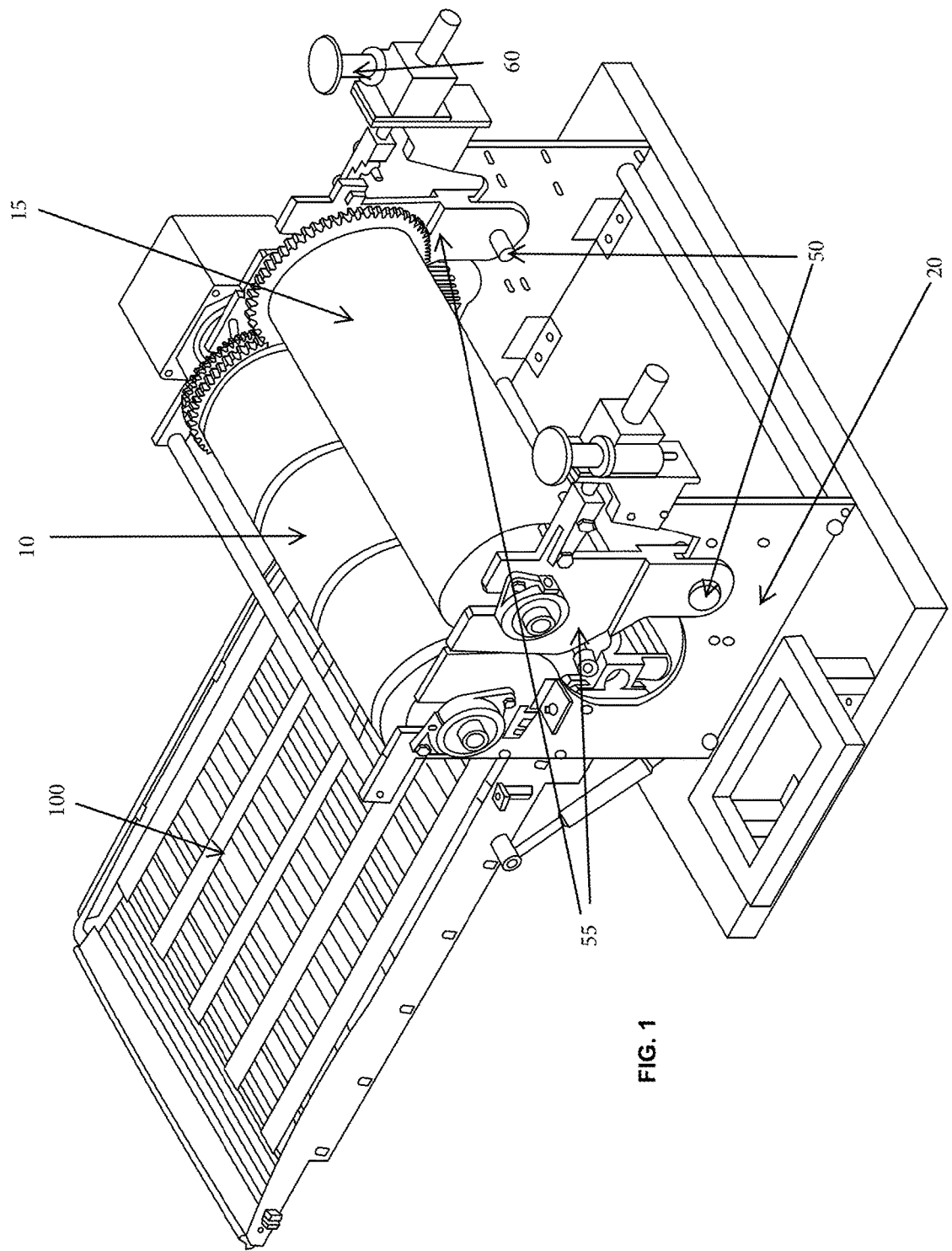
FIG. 1 is a top, rear, and left side perspective view a sheeter.
Figure 2:
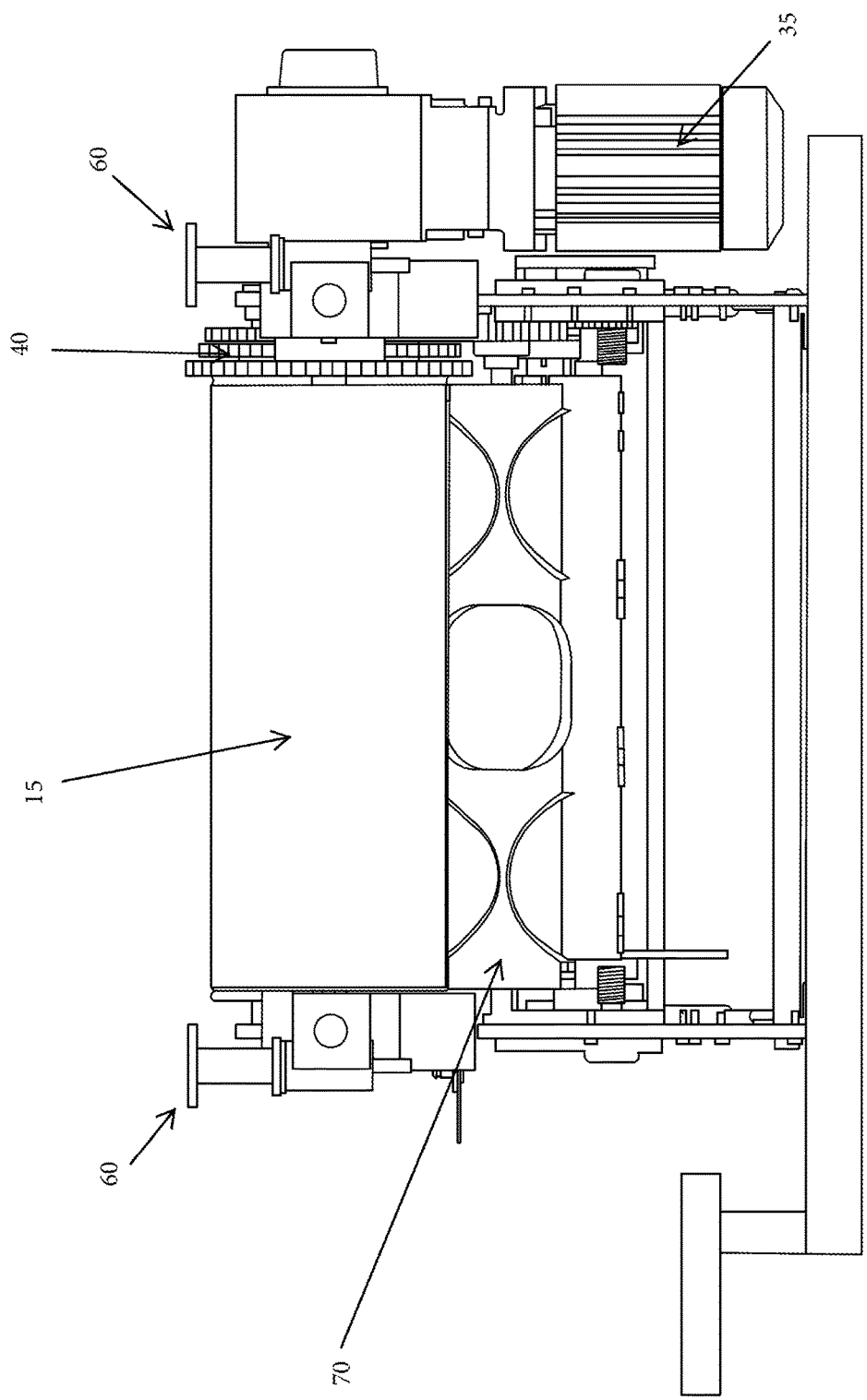
FIG. 2 is a rear elevation view of the sheeter shown in FIG. 1.
Figure 3:
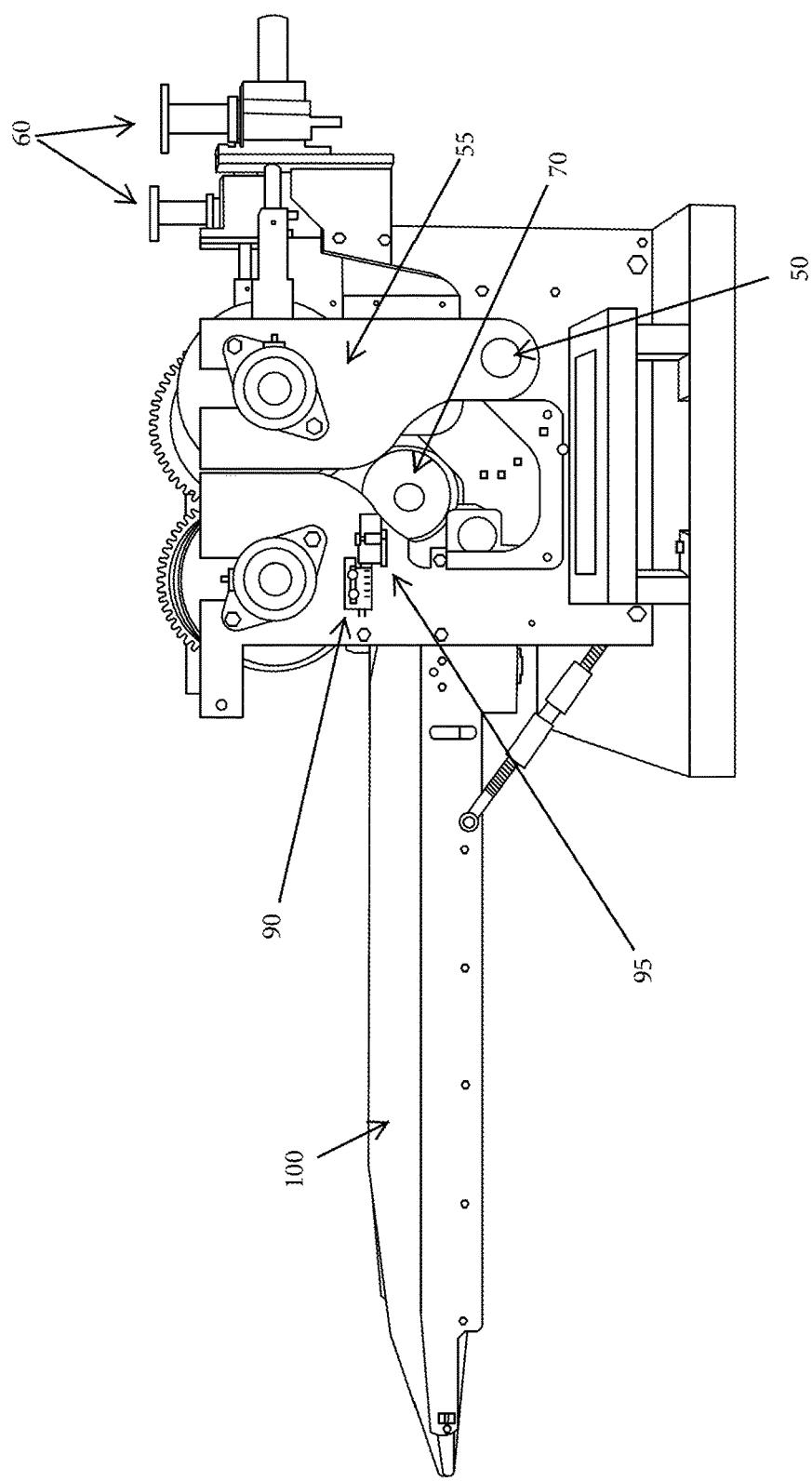
FIG. 3 is a left side elevation view of the sheeter shown in FIG. 1.
Figure 4:
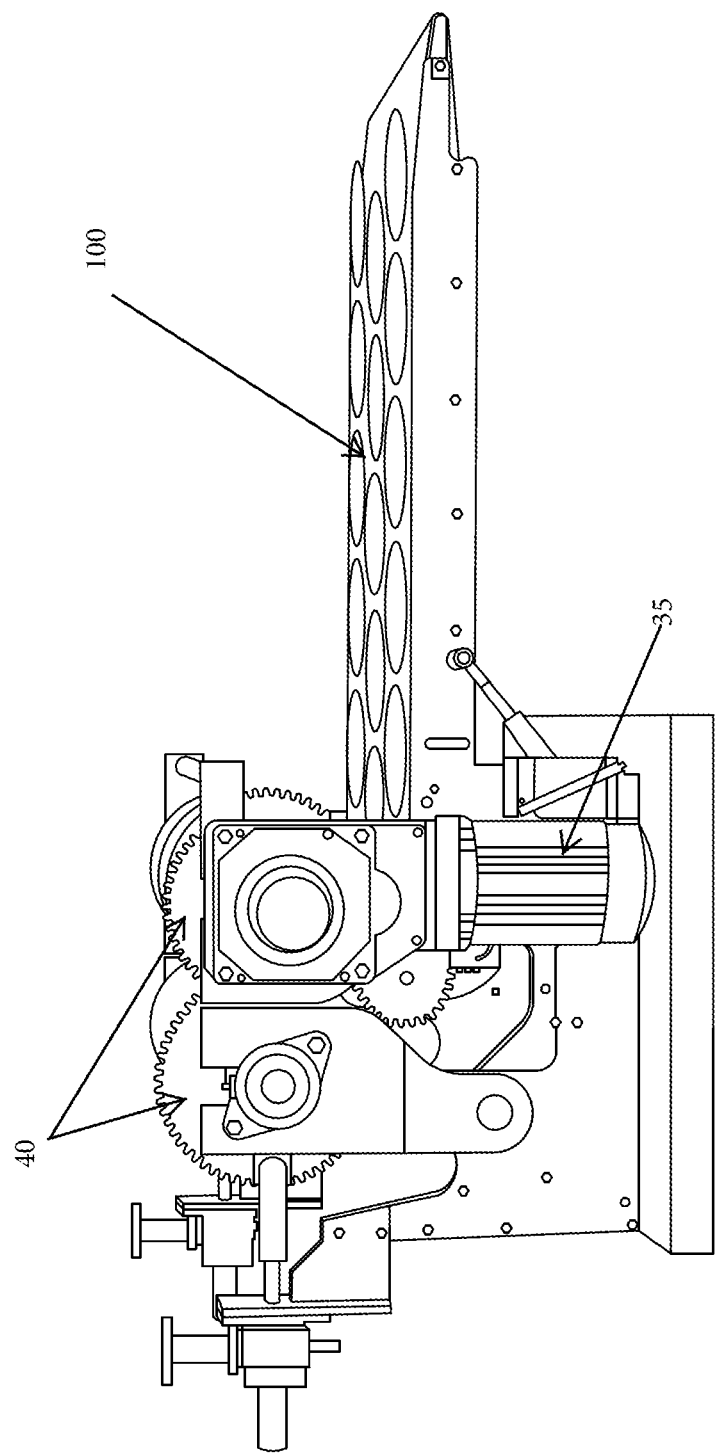
FIG. 4 is a right side view of the sheeter shown in FIG. 1.
Figure 5:
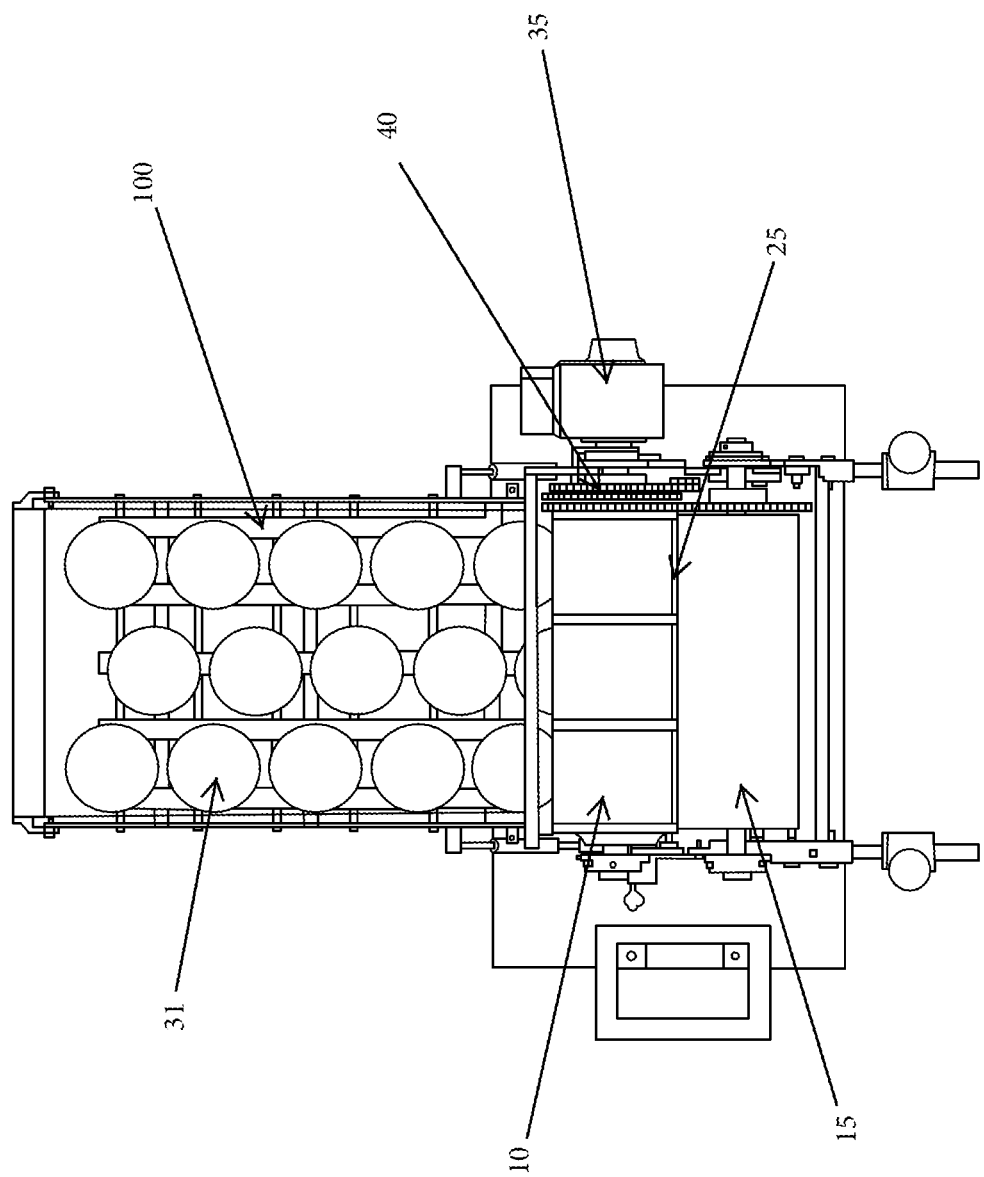
FIG. 5 is a top plan view of the sheeter shown in FIG. 1.
Figure 6:
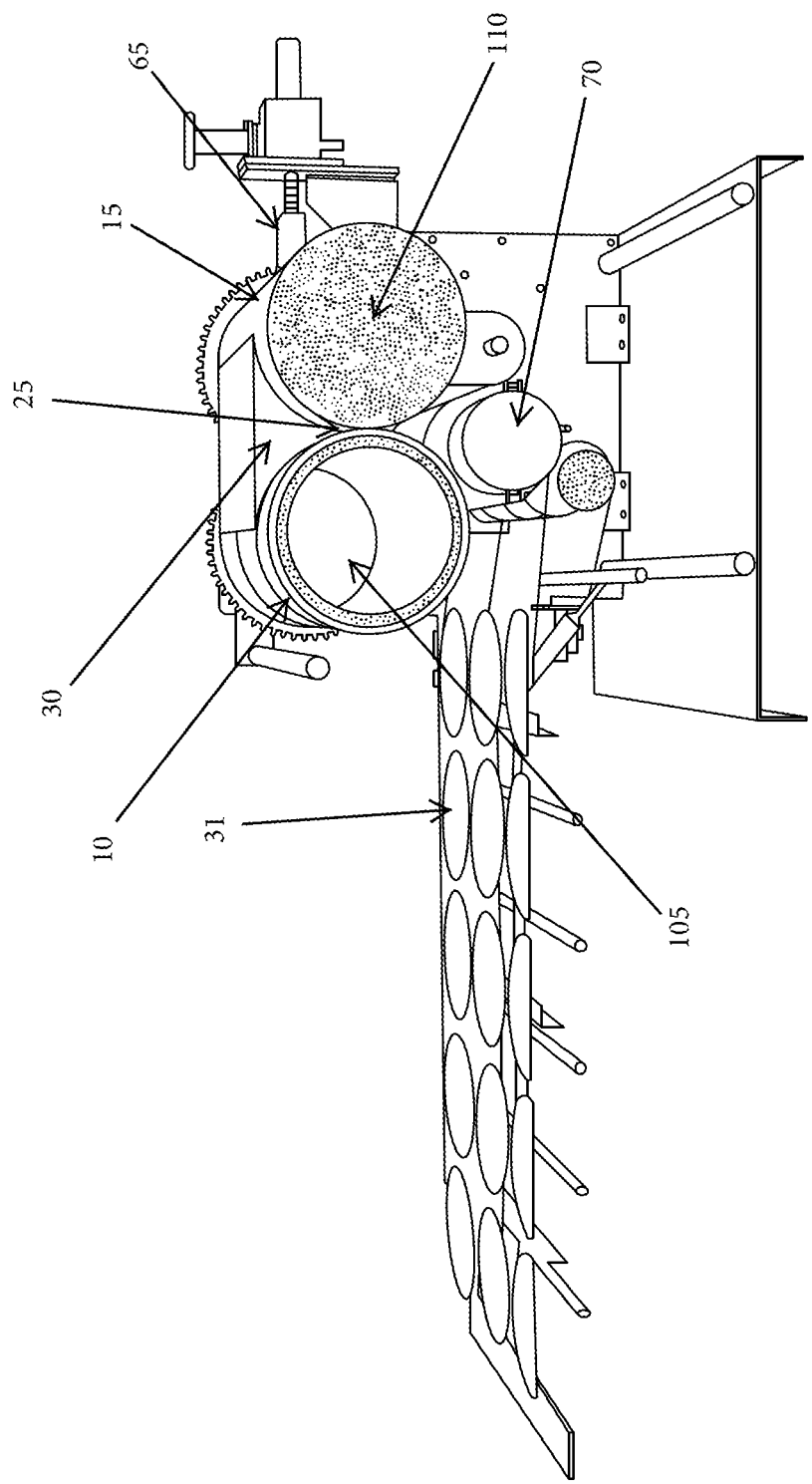
FIG. 6 is a left side cut-away view of the sheeter shown in FIG. 1.

The sheeter of the present invention is for a food product. It includes at least a front roller 10 and a rear roller 15. Each roller is rotatably positioned in a frame 20 wherein the rollers are spaced apart from each other to create a slot 25 through which food dough 30 is sheeted into a food product, for example, tortillas 31. A motor 35 drives gears 40, including gears fixedly attached to both the front roller and the rear roller. The front and the rear roller may be driven at the same speed or at different speeds.

In a preferred embodiment the width of the slot is adjustable. In a preferred embodiment the width of the slot 25 is adjustable by pivoting the rear roller forward or backward on pivots 50 attached to brackets 55 that holds the roller. The roller is locked in place by screw clamps 60 that clamps an arm 65 extending from the bracket.

A third roller comprising a die cutting roller 70 is in rolling contact or near contact with the front sheeting roller and cuts out a desired shape from the roller, leaving rework to be preferably recycled an re-sheeted. In a preferred embodiment, the die cutting roller is in contact or near contact with the front roller.

The dough 30 is fed from above the machine using, for example, a hopper or other suitable feed mechanism (not shown). The dough is placed between the top of the front and the rear roller 15 and fed into the gap formed between the roller such that when these rollers rotate downward towards each other, the dough is drawn between the rollers through the narrow gap. The dough sheet formed by compression though the gap adheres to the front roller.

The die cut roller 70 makes contact against, or near contact against, the front roller and rolls at substantially the same speed as the front roller. The die cut roller has blades in the desired shape for the product. The sheet of dough exiting the gap and adhered to the front roller is cut against the front roller by the die cut roller as it passes through the point of contact or near contact between the front roller and the die cut roller.

The sheeted dough is adhered to the front roller as it begins to roll through the die cut roller and is cut into the shapes dictated by the die cut roller. In one embodiment the die cut roller assists in releasing the cut out portion of the sheet from the front roller. In an alternate embodiment the sheet exits the die cut roller adhered to the front roller, but cut into shapes. In a preferred embodiment a round shape 85 is formed for the creation of tortillas.

In one embodiment, a stripper wire is threaded against the bottom of the front roller. The stripper wire is threaded through at least one side of the frame that holds the rollers through an opening in the frame. The opening can include a bracket 90. The bracket may include clamps or pins and adjustment markers that permit adjustment of the positioning of the wire. The positioning of the wire may include an adjuster to adjust how close wire is positioned to the front roller or, if the wire is placed against the surface, to adjust the force of the wire against the surface.

The wire may terminate on a tensioner 95 that permits adjustment of the tension exerted on the wire. In a preferred embodiment, the stripper wire is threaded against the bottom surface of the front roller and in front of the die cut roller.

The front roller may include one or more grooves around its circumference. A hoop or band may be placed around the font roller at each groove and seated into the groove. The hoop or band may be sufficiently loose in comparison to the circumference of the front roller to thread the stripper wire underneath the hoop and against the front roller. In this way the hoop assists in keeping the stripper wire secured against the front roller.

A moving belt 100 is positioned underneath the stripper wire to carry the stripped product away from the front roller and to the next station of production. The cut out portions of the sheeted dough fall off the front roller onto the conveyor belt to be conveyed to the next step of the process, for example drying, partial or complete baking or frying, packaging, etc.

The speed of the sheeter machine is adjustable by adjusting the speed of the motor that turns the rollers. The speed of the machine determines the rate of sheeting.

In one embodiment, the front roller of the sheeter includes a combination of non-stick areas and non-release areas. In a preferred embodiment, the areas of the roller alternate along the axial length of its surface from non-release to non-stick to non-release to non-stick, continuing several times, and finally ending in a non-release area on the end of the roller.

In use, the non-release areas correspond to the areas in which the rework remains adhered to the roller and is carried up and around by the front roller back into the fresh dough deposited by the hopper. The non-stick areas correspond to the areas in which the cut out portions of the sheet separate from the front roller and fall to the moving belt.

The non-stick areas of the roller are smooth. The surfaces of the non-stick areas curve with the curvature of the roller and are substantially flat along the axial direction of the roller. In a preferred embodiment, the non-stick area does not include any grooves, indentations, bumps, apertures, or other structural features on its surface that interrupt the smooth surface.

The smooth, uninterrupted surface of the non-stick area, in combination with the surface finish of the non-stick area, allows the fast and efficient release of the cut out sheeted dough from the front roller.

The surface finish of the non-stick area that contacts the dough sheet may be the surface of the roller, for example the polished surface of a metal roller or the plastic or polymer surface of a plastic or polymer roller. Alternatively, the surface finish may be an applied film coating such as a paint or varnish, or an applied electro-coating or powder-coating.

Figure 7:
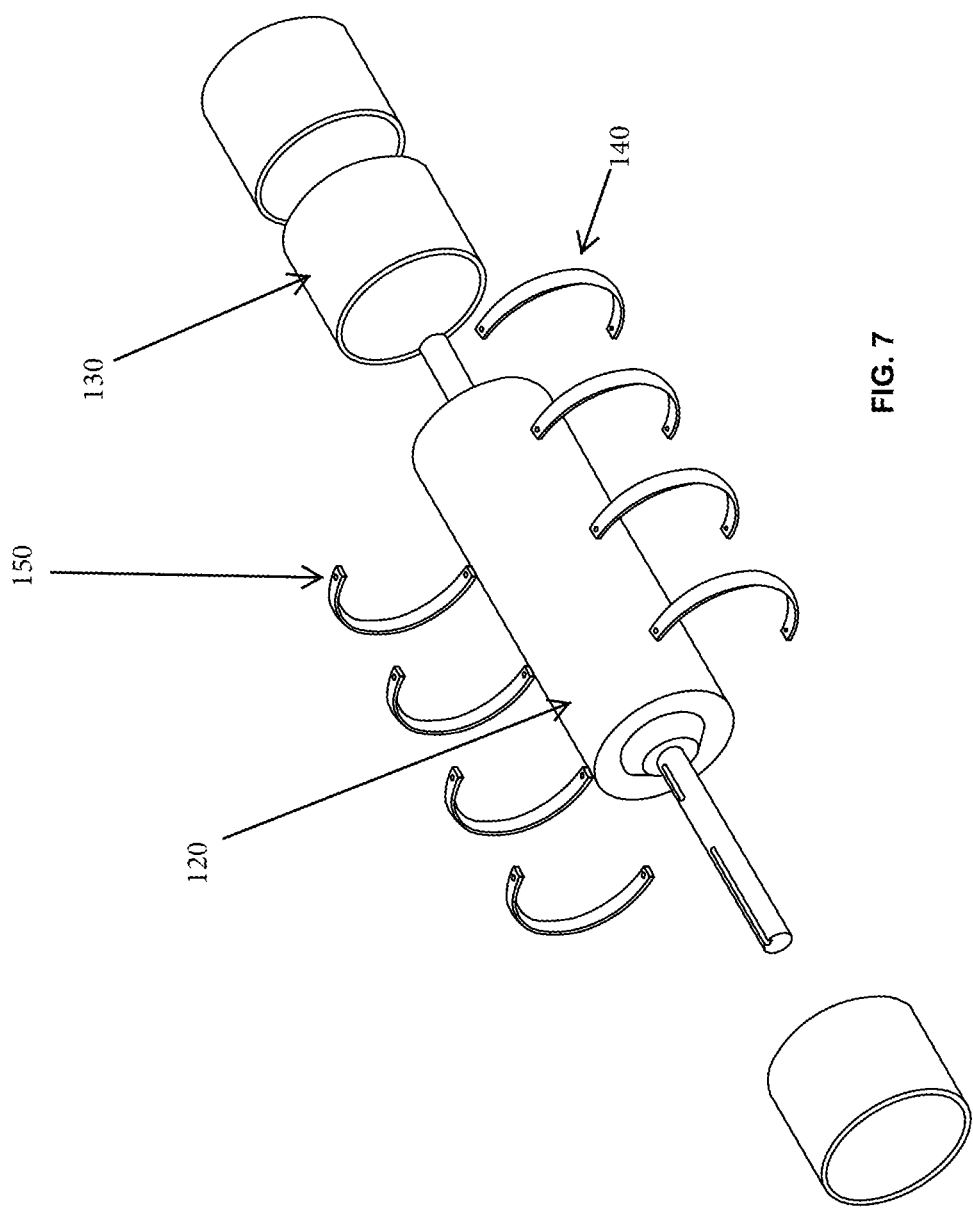
FIG. 7 is an exploded view of the assembly of the front roller of the sheeter.

In a preferred embodiment shown in FIG. 7, the surface finish of the non-stick area arises from a cylindrical sleeve 130. The surface finish of the sleeve may be according to any of the above mentioned methods. In a preferred embodiment, the cylindrical sleeve is composed of non-stick material. The cylindrical sleeve may be provided in separate cylindrical segments separated along the axial direction of the roller, as shown in FIG. 7. The segmentation of the cylindrical sleeve may ease manufacture, assembly, and disassembly.

In a preferred embodiment the surface finish of the non-stick area is Teflon®.

The non-release area of the roller comprises structures adapted to hold the stripping wire against the surface of the roller and adapted for non-release of the rework dough. The above noted grooves in the front roller that hold a hoop or band are confined within the non-release area of the roller. The non-release area may also include additional grooves not associated with a band or hoop.

In a preferred embodiment, an additional groove is placed on either side of the groove that holds the hoop. Such additional grooves provide a mechanical means by which the non-release surface holds the dough sheet. As the sheeted dough rotates through the die cut roller and is cut and continues rotating through the stripper wire and is stripped, the additional grooves provide an edge and a recess that can catch the soft dough in the non-release area and help carry it upward around the front roller to be recycled.

The rollers may be hollow 105 or solid 110 and may be made of a variety of materials. The rollers may be constructed of a combination of materials with an inner material and an outer material.

Figure 8:
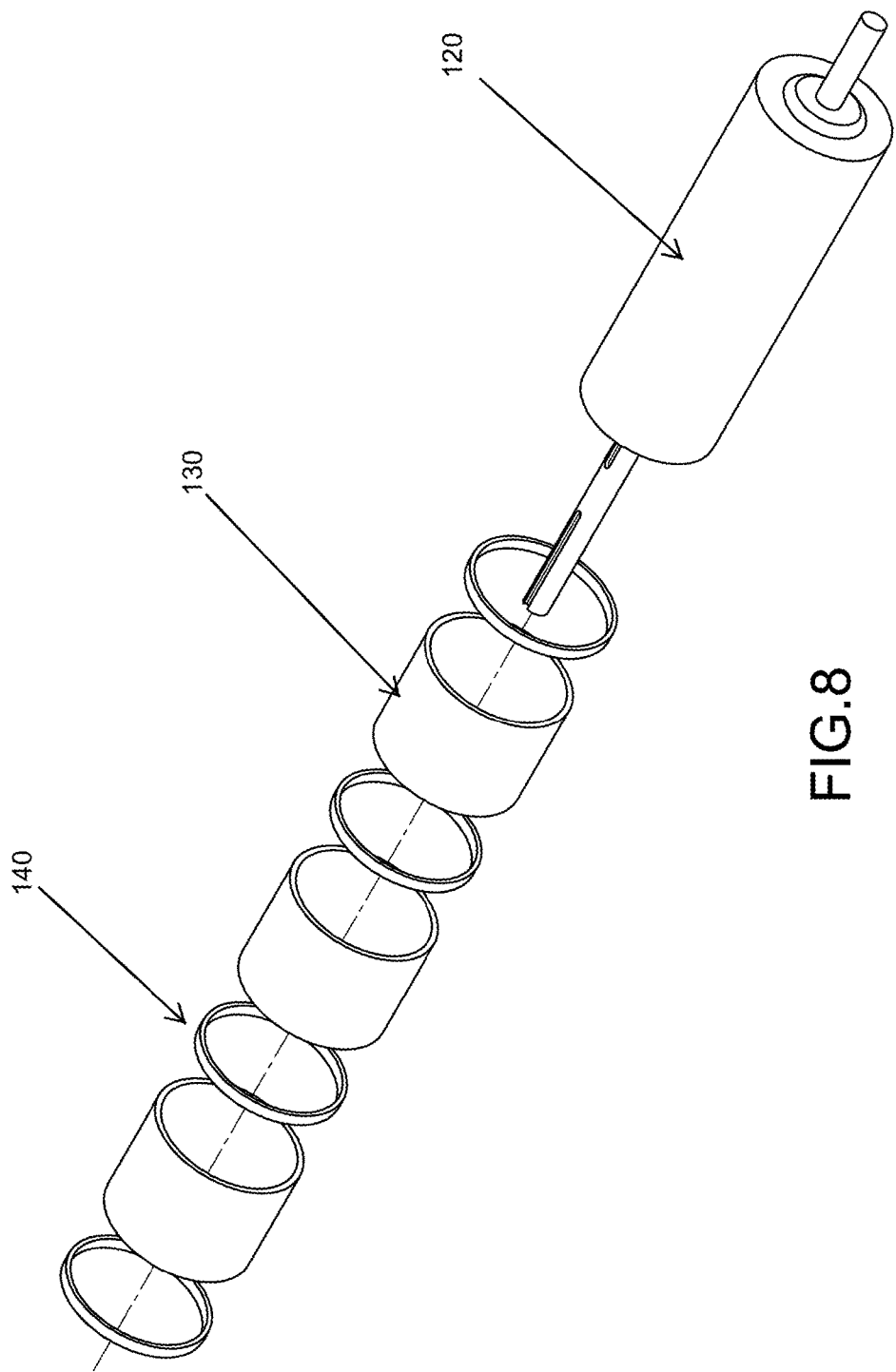
FIG. 8 is an additional exploded view of the assembly of the front roller of the sheeter showing a different embodiment as compared to FIG. 7.

In a preferred embodiment, the front roller comprises an inner roller 120 and one or more cylindrical sleeves 130 that slide onto the inner roller. Rings 140 are clamped onto the inner roller in between each sleeve and at the end of the roller. In a preferred embodiment the rings are formed in two parts. Each of the two parts of each ring includes a hole 150 on each end that allows a screw or bolt to secure the ring to the inner roller. In an alternate embodiment as shown in FIG. 8, the rings are formed in a single part. FIG. 8 shows how the rings and cylindrical sleeves may be threaded onto an inner roller 120 in a sequential manner.

Figure 9:
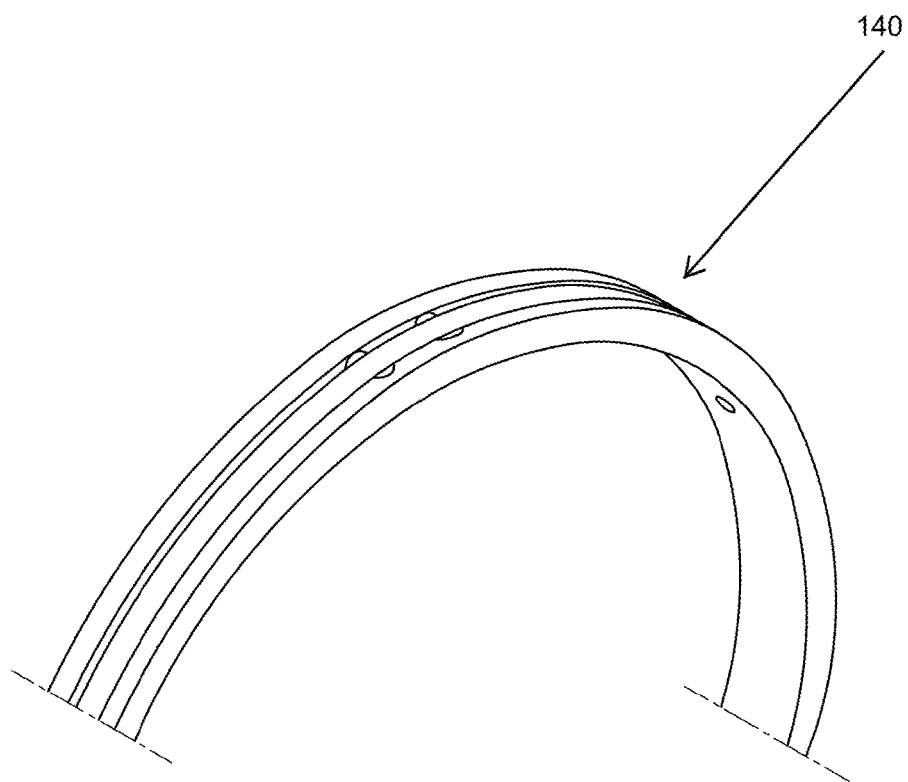
FIG. 9 is a close up view of the ring 140 shown in FIGS. 7 and 8.
Figure 10:
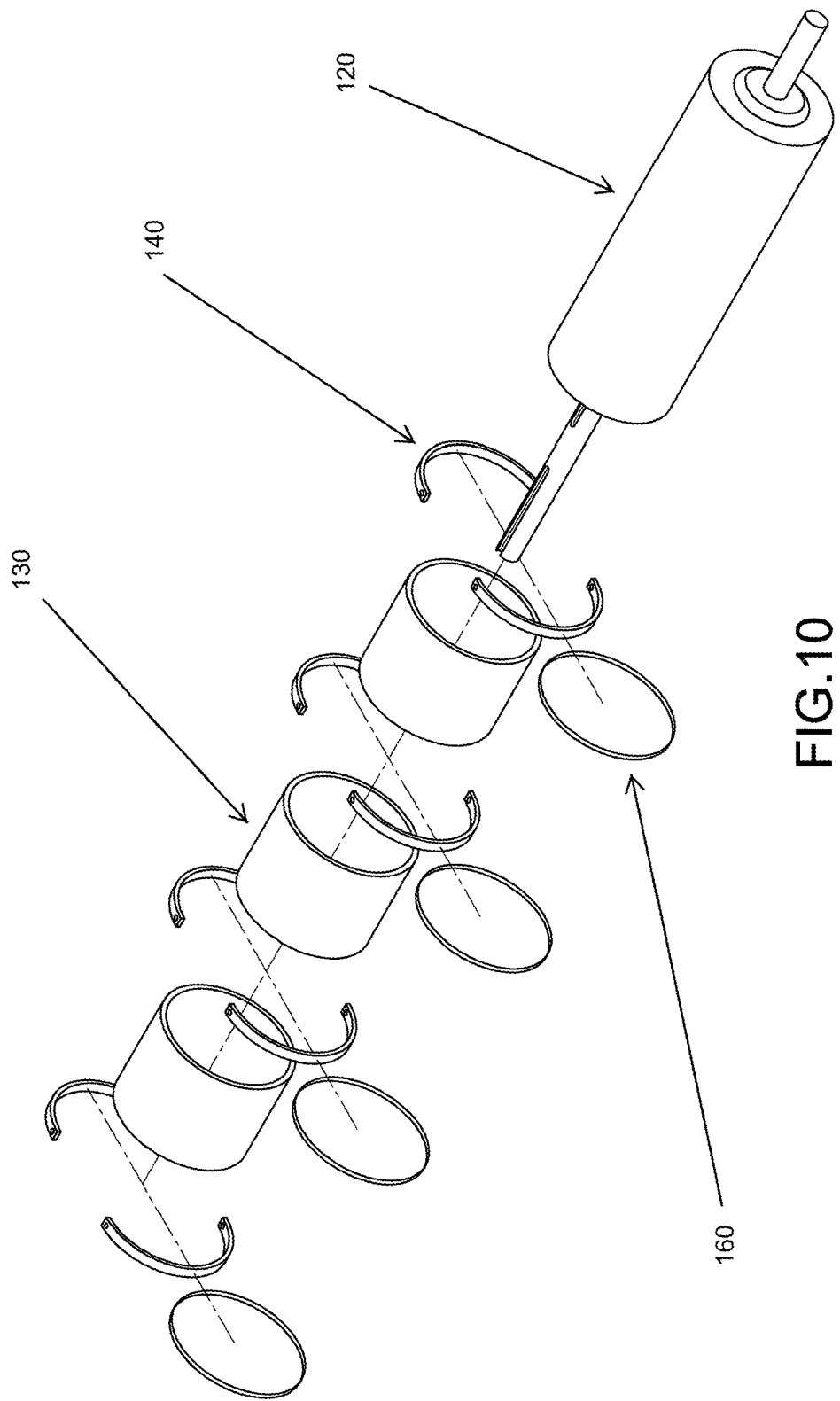
FIG. 10 is an additional exploded view of the assembly of the front roller of the sheeter
Figure 11:
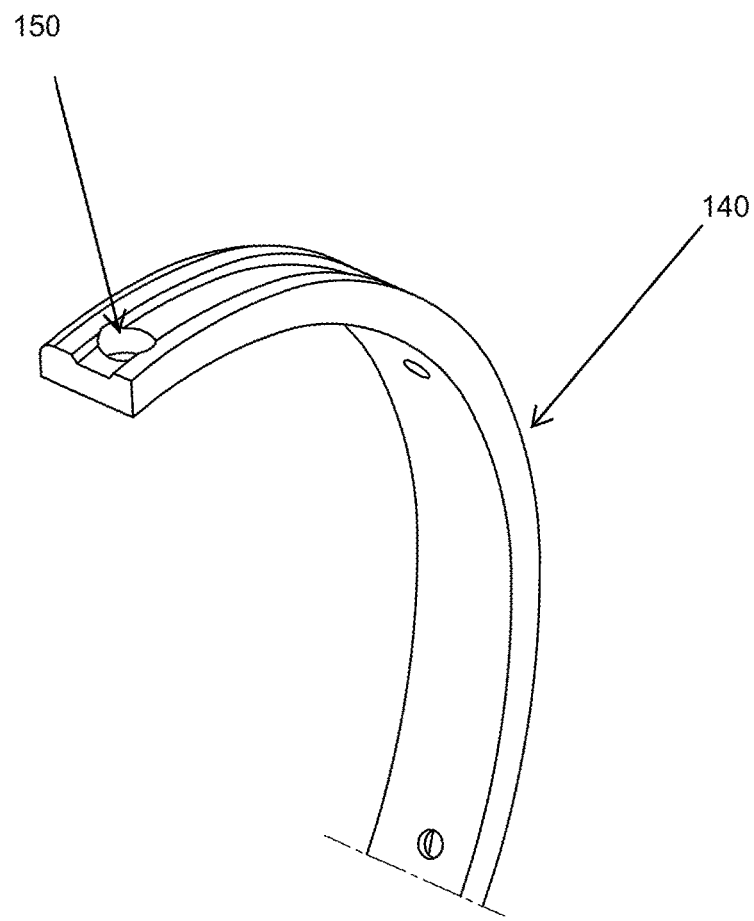
FIG. 11 is an additional close up view of the ring 140 shown in FIGS. 7 and 8, which shows the hole 150.

FIG. 9 shows a ring with a groove configured to hold the hoop or band that holds the stripper wire. FIG. 11 is a close up view of a ring implemented in two parts with a hole 150 for a screw or bolt to secure it to the roller and also showing a groove to hold the band for the stripper wire. FIG. 10 shows an assembly that includes rings formed in two parts and the hoops or band 160 for the stripper wire.

The sleeves placed between the rollers may closely contact the edge of the rings. In an alternative embodiment, the edges of the rings are spaced apart from the edges of the sleeves to form a groove between the ring and the sleeve. Such grooves can comprise the additional grooves described above. The grooves can be the full depth of the thickness of the sleeve. In such embodiment, the bottom of the groove is defined by the surface of the inner roller.

In an alternative embodiment, the sleeve has a lip with the longer portion of the lip placed against the inner roller and against the ring such that the groove width corresponds to the lip width and the groove depth corresponds to the lip depth. In this embodiment, the bottom of the groove is defined by the surface of the lip of the sleeve.

In a preferred embodiment, the sleeve is secured to the inner roller though friction and tension. The friction and tension can arise through a manufacturing process wherein the sleeve is heated or the inner roller is cooled, or both, such that the inner roller is smaller in outer diameter than the inner diameter of the sleeve due to the difference in temperature. If the sleeve and inner roller are properly sized, in this state the sleeve can be slid over the roller and placed at its desired position, and when the temperatures of the components equalize, the sleeve contracts and/or the roller expands to create a tight fit. With sufficiently tight tolerances, sufficient tension and friction can be achieved such that fasteners are not required to secure the sleeve to the inner roller.

The sheeter and roller of the present invention permit a method of sheeting very thin sheets at high speed and with efficient recycling or the rework. In particular, the sheeter can operate at a speed of approximately 90 feet per minute producing corn tortillas 25 to 30 mils or 635 to 762 microns thick.

The invention claimed is:

1. A roller for a comestible product sheeter comprising:
a cylindrically shaped roller having an outer surface;
a plurality of circumferential grooves spaced along the surface of the roller and comprising a first set of grooves;
a hoop made of a band positioned in each groove and less wide than the grooves in which each band is placed;
wherein the surfaces of the groove and the surface immediately adjacent to either side of each groove is a non-release surface material;
wherein the surface material of the roller between the non-release surfaces is a non-stick material.

2. The roller claimed in claim 1 further comprising a second set of circumferential grooves positioned between the non-release surface and the non-stick surface.

3. The roller claimed in claim 2 wherein the second set of grooves is less wide than the first set of grooves.

4. The roller claimed in claim 1 wherein the non-release surface is metal.

5. The roller claimed in claim 4 wherein the metal surface has a rough finish.

6. The roller claimed in claim 1 wherein the non-stick surface is plastic.

7. The roller claimed in claim 1 wherein the non-stick surface is polytetrafluoroethylene.

8. The roller claimed in claim 1 wherein the roller can be operated in a comestible product sheeter at a speed greater than 80 feet per minute.

9. The roller claimed in claim 1 wherein the roller can be operated in a comestible product sheeter to produce a sheeted comestible product exiting the roller with thickness of 20-35 mils as measured prior to drying or cooking, and at a speed of 80-90 feet per minute.

10. The roller claimed in claim 1 wherein the grooves and the non-release surface adjacent to the grooves are part of a removable hoop fastened onto the roller.

11. The roller claimed in claim 10 wherein the removable hoop fastened onto the roller is made of metal.

12. The roller claimed in claim 10 wherein the removable hoop fastened onto the roller is fastened with bolts or screws and configured in two or more parts.

13. The roller claimed in claim 1 wherein the non-stick surface is part of a removable hollow cylinder placed over the roller.

14. The roller of claim 13 wherein the removable hollow cylinder is friction and tension fitted to the roller.

15. The roller of claim 1 wherein the grooves are of generally rectangular cross section.

* * * * *